United States Patent
Mochizuki et al.

(10) Patent No.: US 10,399,481 B2
(45) Date of Patent: Sep. 3, 2019

(54) VEHICLE LAMP SYSTEM WITH VERTICALLY ADJUSTABLE OPTICAL AXIS

(71) Applicants: Koito Manufacturing Co., Ltd., Tokyo (JP); TOYOTA JIDOSHA KABUSHIKI KAISHA, Toyota-shi, Aichi-ken (JP)

(72) Inventors: Kiyotaka Mochizuki, Shizuoka (JP); Atsushi Uesugi, Shizuoka (JP); Hideki Uchida, Shizuoka (JP); Tatsuya Takagaki, Nisshin (JP); Takatoshi Nakagawa, Toyota (JP)

(73) Assignees: Koito Manufacturing Co., Ltd., Tokyo (JP); Toyota Jidosha Kabushiki Kaisha, Toyota-shi (JP)

(*) Notice: Subject to any disclaimer, the term of this patent is extended or adjusted under 35 U.S.C. 154(b) by 73 days.

(21) Appl. No.: 15/221,853

(22) Filed: Jul. 28, 2016

(65) Prior Publication Data

US 2017/0028903 A1 Feb. 2, 2017

(30) Foreign Application Priority Data

Jul. 31, 2015 (JP) .................. 2015-152337

(51) Int. Cl.
*B60Q 1/14* (2006.01)
*B60Q 1/10* (2006.01)
(Continued)

(52) U.S. Cl.
CPC ................. *B60Q 1/14* (2013.01); *B60Q 1/10* (2013.01); *B60Q 11/00* (2013.01); *F21S 41/143* (2018.01);
(Continued)

(58) Field of Classification Search
CPC ........ B60Q 2300/056; B60Q 2300/146; B60Q 1/10; B60Q 1/14; B60Q 11/00
See application file for complete search history.

(56) References Cited

U.S. PATENT DOCUMENTS 7,501,767 B2 * 3/2009 Hayami .................. B60Q 1/10 307/10.1
2003/0090905 A1 * 5/2003 Uchida ................ B60Q 1/1415 362/465

(Continued)

FOREIGN PATENT DOCUMENTS

| JP | 2003-127760 A | 5/2003 |
| JP | 2008-137516 A | 6/2008 |
| JP | 2014-012493 A | 1/2014 |

OTHER PUBLICATIONS

Japanese Patent Office Action on Patentability for Japanese Application No. JP 2015-152337, dated Jun. 27, 2017.

*Primary Examiner* — Anh T Mai
*Assistant Examiner* — Michael Chiang

(57) ABSTRACT

A vehicle lamp system includes a high-beam lamp unit that can form a high-beam light-distribution pattern, a leveling mechanism that vertically adjusts an optical axis of the high-beam lamp unit, and a control unit that controls on/off of the high-beam lamp unit and controls the leveling mechanism. Upon the engine being started, the control unit controls the high-beam lamp unit to turn on for a predetermined period of time in a state in which the leveling unit adjusts the optical axis of the lamp unit to aim more vertically downward than in normal operation.

5 Claims, 6 Drawing Sheets

(51) Int. Cl.
    *B60Q 11/00*     (2006.01)
    *F21S 41/143*     (2018.01)
    *F21S 41/141*     (2018.01)
    *F21S 41/29*     (2018.01)
    *F21S 45/47*     (2018.01)

(52) U.S. Cl.
    CPC .. *B60Q 2300/054* (2013.01); *B60Q 2300/056* (2013.01); *B60Q 2300/146* (2013.01); *F21S 41/141* (2018.01); *F21S 41/295* (2018.01); *F21S 45/47* (2018.01)

(56) References Cited

U.S. PATENT DOCUMENTS

| | | | |
|---|---|---|---|
| 2014/0009065 A1* | 1/2014 | Sasaki | B60Q 1/44 315/80 |
| 2014/0198516 A1* | 7/2014 | Tajima | F16H 19/08 362/523 |

\* cited by examiner

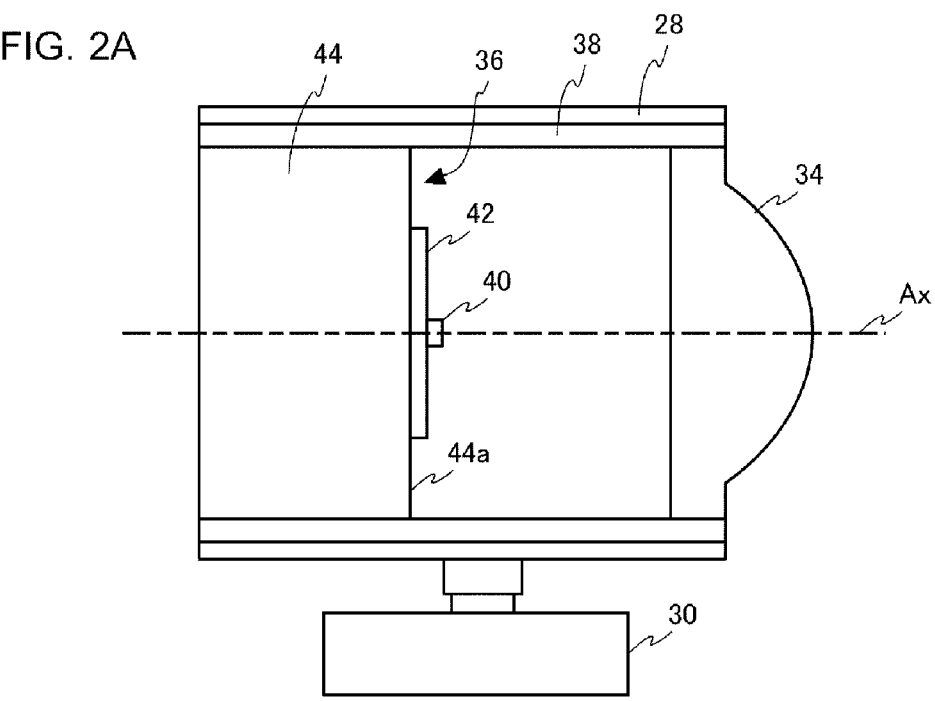
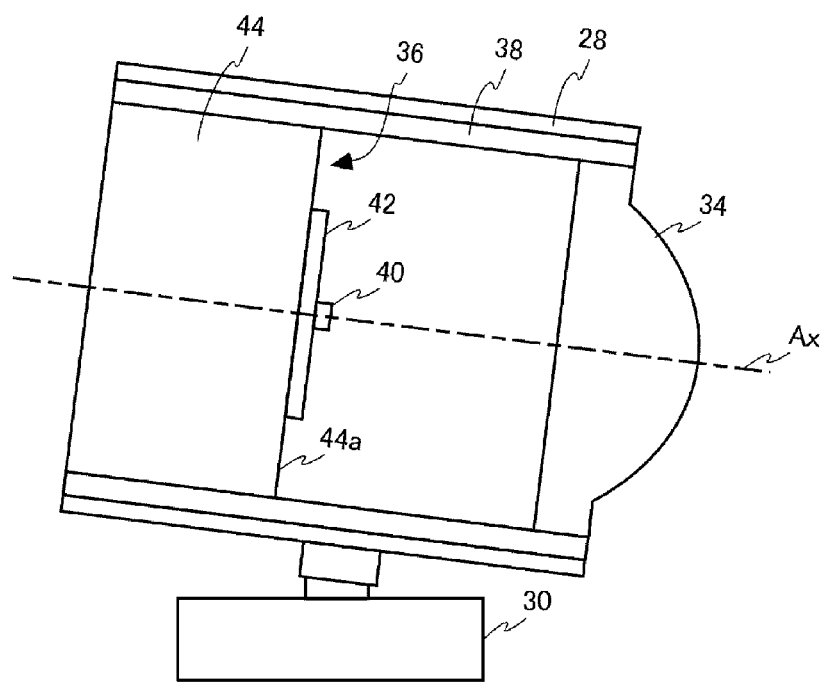

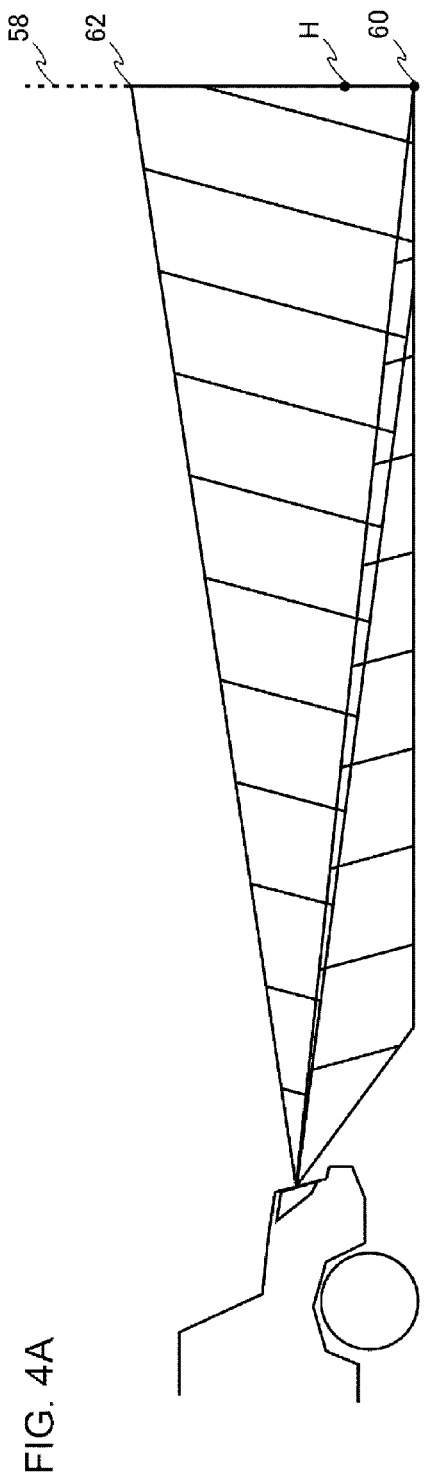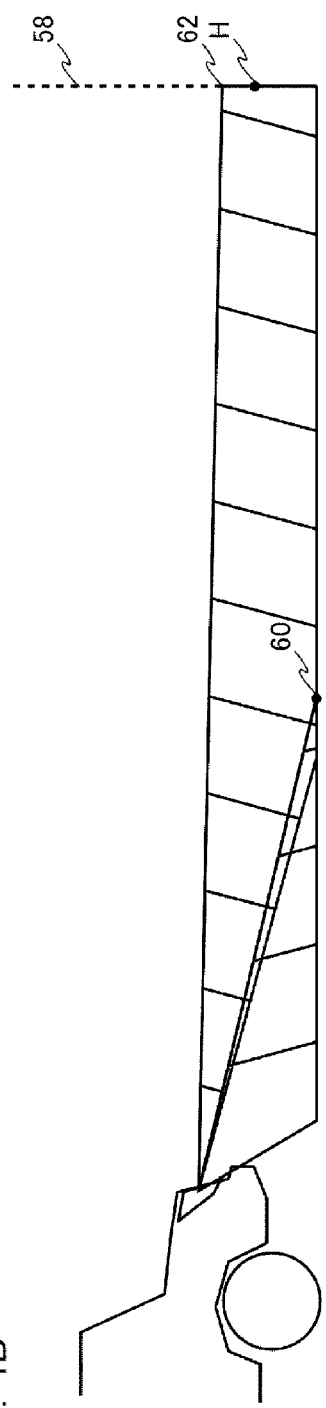
FIG. 4A
FIG. 4B

VEHICLE LAMP SYSTEM WITH VERTICALLY ADJUSTABLE OPTICAL AXIS

BACKGROUND OF THE INVENTION

1. Field of the Invention

The present invention relates to vehicle lamp systems for use in automobiles or the like.

2. Description of the Related Art

Typically, a vehicle lamp can switch between a low beam and a high beam. The low beam illuminates objects at a close range at a predetermined illuminance. Light-distribution patterns of the low beam are regulated so as not to cause glare to an oncoming vehicle or a leading vehicle, and the low beam is used mainly when the vehicle travels in a city area. Meanwhile, the high beam illuminates objects at a distant, broad range in front at a relatively high illuminance and is used mainly when the vehicle travels at high speed on a road with little oncoming vehicle or little leading vehicle (see, for example, JP2008-137516).

To carry out a fault diagnosis of a lamp unit, there is a demand such that the lamp unit be turned on to illuminate with a high beam upon the engine being started, for example. However, there is a problem in that a high beam may cause glare to a driver of a vehicle present in front of the started vehicle or to a pedestrian.

SUMMARY OF THE INVENTION

The present invention has been made in view of such a problem and is directed to providing a vehicle lamp system capable of carrying out a fault diagnosis of a lamp unit that illuminates objects with a high beam without causing glare to a driver of a vehicle present in front of the vehicle or to a pedestrian.

To address the above-described problem, a vehicle lamp system according to an aspect of the present invention includes at least one lamp unit that can form a high-beam light-distribution pattern, a leveling unit that vertically adjusts an optical axis of the lamp unit, and a control unit that controls on/off of the lamp unit and controls the leveling unit. Irrespective of whether a turn-on instruction is present, the control unit controls the lamp unit to turn on for a predetermined period of time in a state in which the leveling unit adjusts the optical axis of the lamp unit to aim more vertically downward than in normal operation.

BRIEF DESCRIPTION OF THE DRAWINGS

Embodiments will now be described by way of example only, with reference to the accompanying drawings, which are meant to be exemplary, not limiting and wherein like elements are numbered alike in several figures in which:

FIGS. 2A and 2B are sectional views taken along the A-A line illustrated in FIG. 1;

FIGS. 4A and 4B each illustrate an illumination region of a vehicle lamp;

DETAILED DESCRIPTION OF THE INVENTION

The invention will now be described by reference to the preferred embodiments. This does not intend to limit the scope of the present invention but to exemplify the invention. The size of the component in each figure may be changed in order to aid understanding. Some of the components in each figure may be omitted if they are not important for explanation.

Figure 1:
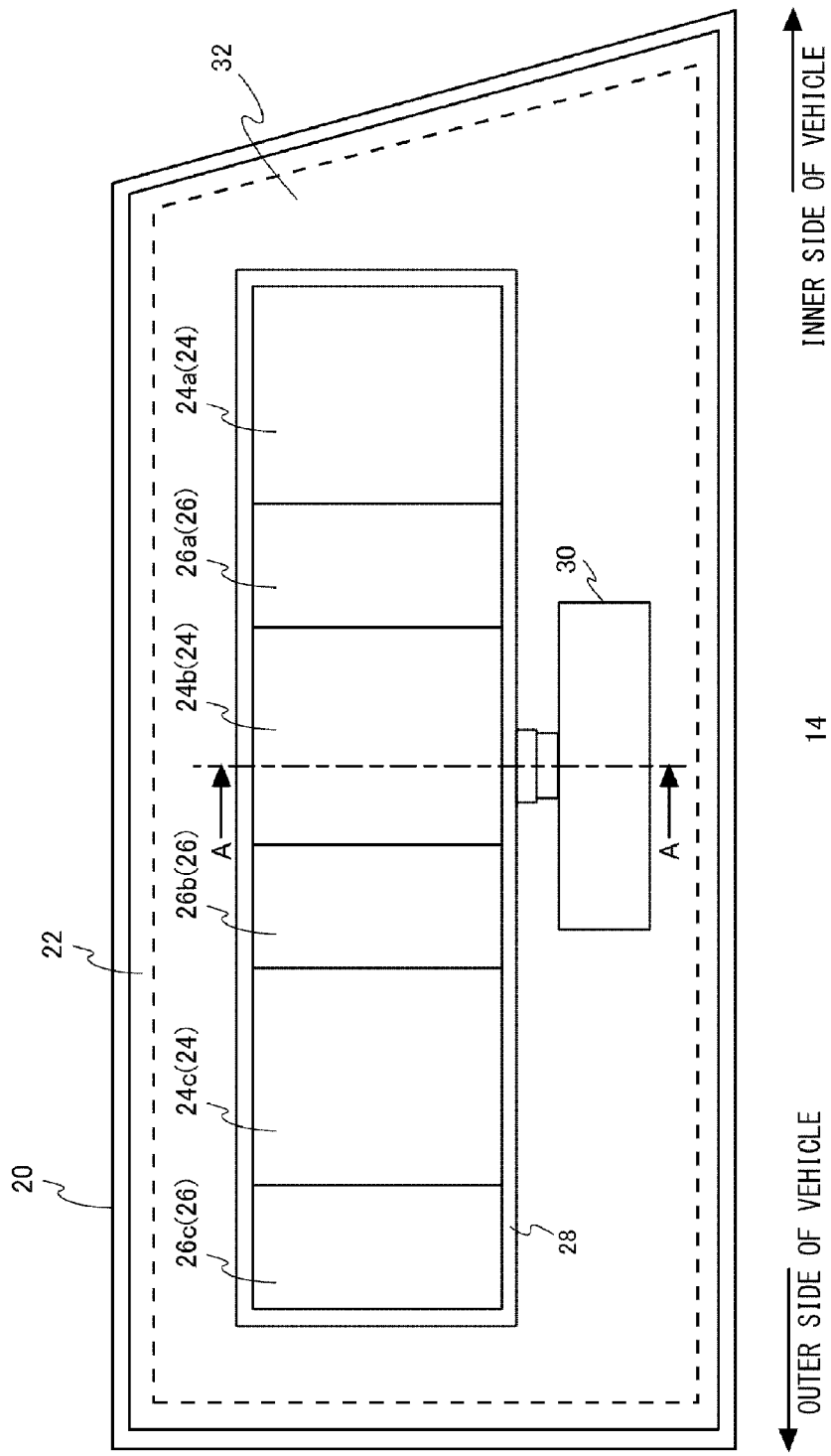
FIG. 1 is a front view illustrating a vehicle lamp used in a vehicle lamp system according to an embodiment.

FIG. 1 is a front view illustrating a vehicle lamp 14 used in a vehicle lamp system according to an embodiment. The vehicle lamp 14 is used as a vehicle headlamp. FIG. 1 illustrates a vehicle lamp 14 located on the left side of the vehicle body as viewed from the front. The vehicle lamp 14 includes a lamp body 20, an outer cover 22, a high-beam lamp unit 24, a low-beam lamp unit 26, a bracket 28, and a leveling mechanism 30.

The lamp body 20 is formed into a box shape having an opening. The outer cover 22 is formed of translucent resin or glass and formed into a bowl shape. The outer cover 22 is mounted to the lamp body 20 so as to cover the opening in the lamp body 20.

The high-beam lamp unit 24 and the low-beam lamp unit 26 are disposed in a lamp room 32 formed by the lamp body 20 and the outer cover 22 and emit light toward a space in front of the vehicle lamp 14.

The high-beam lamp unit 24 includes a first high-beam lamp unit 24a, a second high-beam lamp unit 24b, and a third high-beam lamp unit 24c. The low-beam lamp unit 26 includes a first low-beam lamp unit 26a, a second low-beam lamp unit 26b, and a third low-beam lamp unit 26c. The first high-beam lamp unit 24a, the first low-beam lamp unit 26a, the second high-beam lamp unit 24b, the second low-beam lamp unit 26b, the third high-beam lamp unit 24c, and the third low-beam lamp unit 26c are arranged in this order from the inner side of the vehicle. Hereinafter, when no distinction is made between the high-beam lamp unit 24 and the low-beam lamp unit 26 in particular or when the high-beam lamp unit 24 and the low-beam lamp unit 26 are collectively referred to, simply the term "lamp unit" is used.

The bracket 28 is fixed to the lamp body 20 by a support mechanism (not illustrated). The bracket 28 supports the high-beam lamp unit 24 and the low-beam lamp unit 26.

FIGS. 2A and 2B are sectional views taken along the A-A line illustrated in FIG. 1, or in other words, sectional views of the second high-beam lamp unit 24b. FIG. 2B illustrates a state in which the leveling mechanism 30 has moved the second high-beam lamp unit 24b such that its optical axis Ax extends in a downward direction. The first high-beam lamp unit 24a and the third high-beam lamp unit 24c are configured in a similar manner to the second high-beam lamp unit 24b.

The second high-beam lamp unit 24b is a so-called projector-type lamp and includes a projection lens 34, a light source unit 36, and a holder 38. Alternatively, the second high-beam lamp unit 24b may be a parabolic lamp or a lamp of a different type.

The projection lens 34 is a plano-convex aspherical lens having a convex front surface and a planar rear surface and is disposed in the optical axis Ax that extends in the longitudinal direction of the vehicle. The projection lens 34 is held on its peripheral portion by a front end portion of the holder 38.

The light source unit 36 is disposed such that a light source 40 faces the front in the direction along the optical axis Ax and is held by a back end portion of the holder 38. The holder 38 is mounted to the bracket 28.

The light source unit 36 includes the light source 40, a substrate 42, and a heat sink 44. The light source 40 is constituted, for example, by a light-emitting element, such as a light-emitting diode (LED). The light source 40 is disposed on the substrate 42 and emits light upon being supplied with electricity from the substrate 42.

The heat sink 44 is held by the holder 38, and the substrate 42, on which the light source 40 is mounted, is mounted on a front surface 44a of the heat sink 44. The heat sink 44 is formed of a material with a high heat transfer coefficient, such as aluminum, and dissipates heat produced through light emission of the light source 40.

The leveling mechanism 30 rotationally moves the lamp unit together with the bracket 28 in the vertical direction with a driving force from an actuator (not illustrated). Thus, the optical axis of light emitted from the lamp unit is vertically adjusted.

Figure 3:
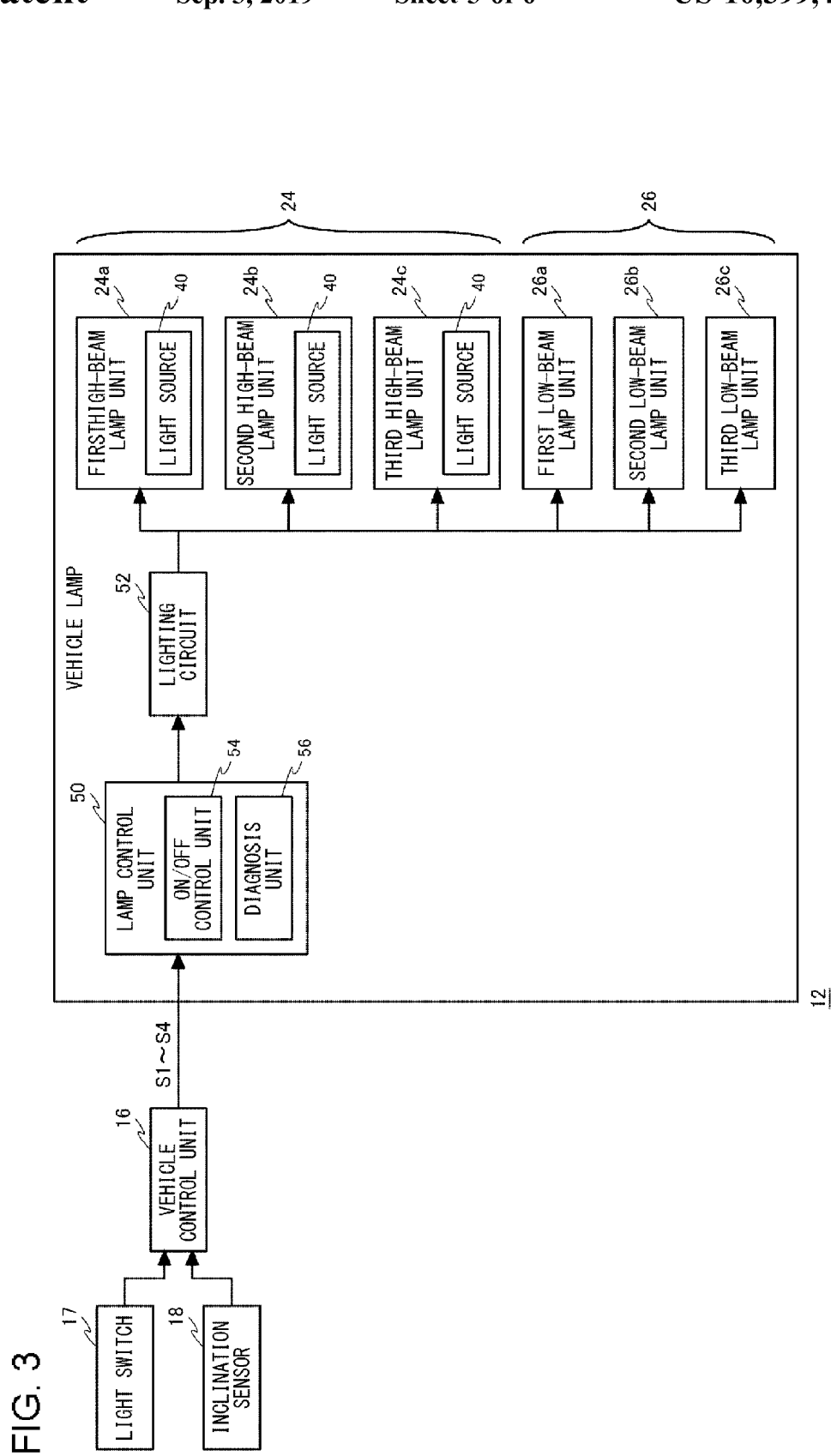
FIG. 3 is a block diagram of a vehicle lamp system according to an embodiment.

FIG. 3 is a block diagram of a vehicle lamp system 12 according to an embodiment. The vehicle lamp system 12 includes a light switch 17, an inclination sensor 18, a vehicle control unit 16, and a vehicle lamp 14. The light switch 17 receives an operation for turning on/off the lamp unit.

The inclination sensor 18 is a sensor for detecting an angle of inclination of the vehicle. The inclination sensor 18 is constituted, for example, by an acceleration sensor. The inclination sensor 18 outputs a signal corresponding to the angle of inclination of the vehicle to the vehicle control unit 16.

The vehicle control unit 16 controls various aspects of the vehicle. Upon the engine being started, the vehicle control unit 16 transmits, to a lamp control unit 50, an initial position detection instruction S1 instructing that the initial position of the lamp unit be detected and a fault diagnosis instruction S2 instructing that a fault diagnosis of each lamp unit be carried out.

In addition, upon the light switch 17 receiving an on/off operation, the vehicle control unit 16 transmits, to the lamp control unit 50, an on/off instruction S3 instructing that the lamp unit be turned on/off.

Furthermore, the vehicle control unit 16 generates an optical axis adjustment instruction S4 on the basis of an output from the inclination sensor 18 and transmits the generated optical axis adjustment instruction S4 to the lamp control unit 50.

The vehicle lamp 14 further includes the lamp control unit 50 and a lighting circuit 52. The lamp control unit 50 includes an on/off control unit 54 and a diagnosis unit 56. Upon receiving an optical axis adjustment instruction S4, the on/off control unit 54 controls the leveling mechanism 30 to adjust the optical axis of the lamp unit to an angle corresponding to the optical axis adjustment instruction S4. In addition, upon receiving an initial position detection instruction S1, the on/off control unit 54 controls the leveling mechanism 30 to detect the initial position of the lamp unit.

When detecting the initial position of the lamp unit, the on/off control unit 54 controls the leveling mechanism 30 to rotate the lamp unit such that the optical axis of the lamp unit extends in a downward direction and to cause a predetermined portion of the lamp unit to abut a stopper (not illustrated) provided in the lamp room 32. The position at which the predetermined portion abuts the stopper or the position moved back from the aforementioned position by a predetermined angle serves as the initial position. Hereinafter, the description continues with a premise that the latter position serves as the initial position.

Upon receiving an on/off instruction S3 from the vehicle control unit 16, the on/off control unit 54 controls the lighting circuit 52 to supply electric power to the light source 40 of the lamp unit. Thus, the high-beam lamp unit 24 turns on.

Upon receiving a fault diagnosis instruction S2, the on/off control unit 54 controls the lighting circuit 52 to turn on the high-beam lamp unit 24. In particular, in order not to cause glare, the on/off control unit 54 controls the leveling mechanism 30 to bring the optical axis of each lamp unit to aim in a more downward direction than that of a normal operation and turns on the high-beam lamp unit 24 in that state.

In the present exemplary embodiment, the high-beam lamp unit 24 is turned on for carrying out a fault diagnosis when the optical axis of each lamp unit has been lowered by the leveling mechanism. 30 for detecting the initial position of the lamp unit. In other words, the on/off control unit 54 lowers the optical axis of each lamp unit with the use of the leveling mechanism 30 upon receiving an initial position detection instruction S1 and a fault diagnosis instruction S2, and turns on the high-beam lamp unit 24 in that state for a fault diagnosis.

In addition, when the high-beam lamp unit 24 is turned on for a fault diagnosis, the on/off control unit 54 controls the high-beam lamp unit 24 to turn on at a luminous intensity that is lower than a luminous intensity at which the high-beam lamp unit 24 is turned on for forming a high-beam light-distribution pattern, or in other words, lower than a luminous intensity at which the high-beam lamp unit 24 is turned on for its intended purpose. In the present exemplary embodiment, the on/off control unit 54 controls the high-beam lamp unit 24 to turn on at a luminous intensity that is 25% of the luminous intensity at which the high-beam lamp unit 24 is turned on for forming a high-beam light-distribution pattern (i.e., at a luminous intensity that is lower by 75%). In addition, when the high-beam lamp unit 24 is turned on for a fault diagnosis, the on/off control unit 54 turns on each of the high-beam lamp units at a different timing.

The diagnosis unit 56 detects the lighting state of each lamp unit and thus determines whether each of the lamp units is faulty. The diagnosis unit 56 determines whether a fault, such as a break, a short, or a ground fault, is present in the light source of the lamp unit by detecting a voltage value or a current value. The technique of diagnosing such faults is well known, and thus further descriptions thereof will be omitted. When the diagnosis unit 56 has detected a fault in the lamp unit, the diagnosis unit 56 outputs a signal indicating to that effect to the vehicle control unit 16.

FIGS. 4A and 4B each illustrate an illumination region of the vehicle lamp 14. FIG. 4A illustrates an illumination region of the lamp unit during normal operation, and FIG. 4B illustrates an illumination region of the lamp unit during a diagnosis. Herein, the normal operation means that the high-beam lamp unit 24 forms a high-beam light-distribution pattern. In other words, the normal operation means that the high-beam lamp unit 24 is used for its intended purpose. For example, in the normal operation, a horizontal cut line 60 of the low-beam lamp unit 26 is at −0.57° relative to a horizontal line H (0°) on a virtual screen 58 that is 10 meters in front of the vehicle. In this case, the high-beam lamp unit 24 illuminates a range covering from a region lower than −0.57° to a region thereabove such that the illumination region of the high-beam lamp unit 24 partially overlaps the illumination region of the low-beam lamp unit 26.

In contrast, during a diagnosis, the lamp unit is rotated such that the optical axis of the lamp unit extends in a more downward direction than that of the normal operation. Preferably, the lamp unit is rotated such that an upper boundary 62 of the illumination region of the high-beam lamp unit 24 is at an angle of no greater than +1° relative to the horizontal line H. In this case, glare caused to a pedestrian at a position 10 meters in front of the vehicle or to a driver therearound is reduced. When the initial position of the lamp unit is being detected, a predetermined portion of the lamp unit abuts against the stopper in a state in which the optical axis of the lamp unit is lower by approximately 3° to 4° than that of the normal operation. When the high-beam lamp unit 24 is turned on in this state, the upper boundary 62 of the illumination region of the high-beam lamp unit 24 is at an angle of 0° to +1° relative to the horizontal line H.

Figure 5:
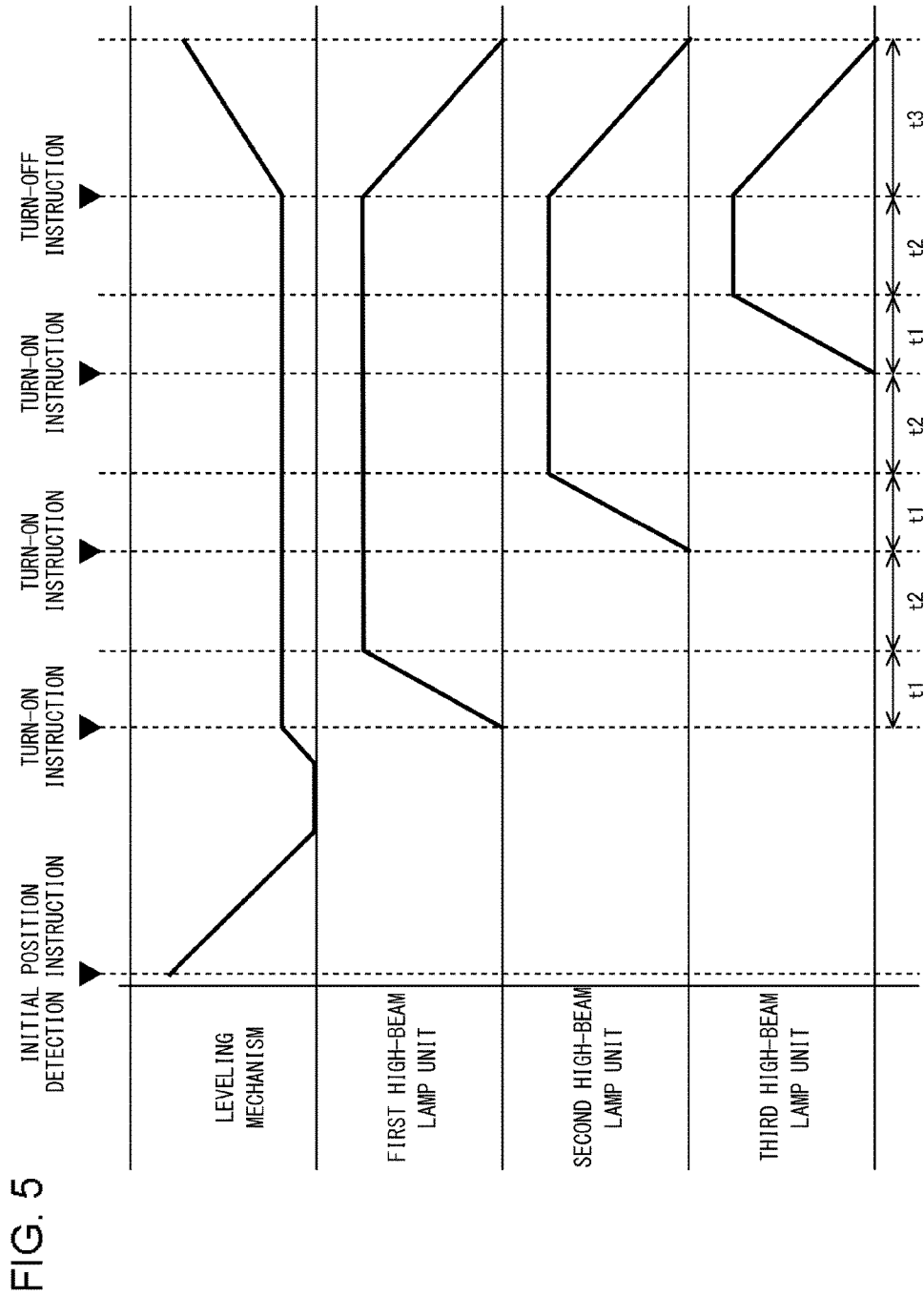
FIG. 5 illustrates an example of on/off timings of a high-beam lamp unit during a fault diagnosis.

An operation of the vehicle lamp system 12 configured as described above during a fault diagnosis will be described. FIG. 5 illustrates an example of on/off timings of the high-beam lamp unit 24 during a fault diagnosis. FIGS. 6A through 6E each illustrate a lighting state of the lamp units during the fault diagnosis. The hatching in FIGS. 6A through 6E indicates that the lamp unit is on.

Figure 6A:
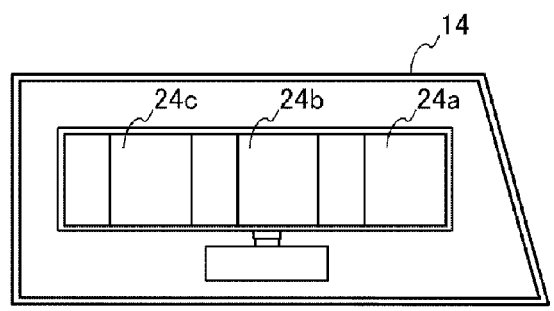
FIGS. 6A through 6E each illustrate a lighting state of lamp units during a fault diagnosis.

As illustrated in FIG. 6A, all of the lamp units are off. First, upon the engine being started, the vehicle control unit 16 instructs the on/off control unit 54 to detect the initial position of the lamp unit and to carry out a fault diagnosis of the lamp unit. Upon receiving the instructions, the on/off control unit 54 starts detecting the initial position of the lamp unit. The on/off control unit 54 controls the leveling mechanism 30 to cause a predetermined portion of the lamp unit to abut the stopper. The on/off control unit 54 retains the lamp unit at the initial position, which is the position to which the lamp unit that has abutted the stopper is moved back by a predetermined angle, or in other words, in a state in which the optical axis extends in a more downward direction than that of the normal operation.

Figure 6B:
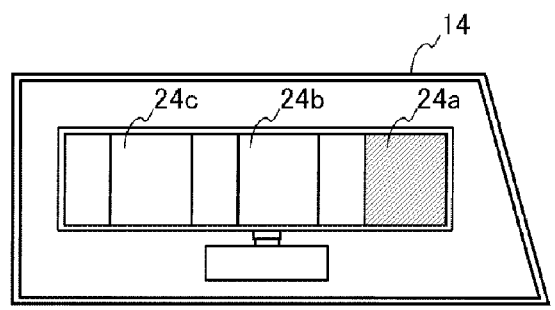

As illustrated in FIG. 5, the on/off control unit 54 controls the first high-beam lamp unit 24a to reach target luminance in a time t1 (e.g., 200 msec). At this point, the diagnosis unit 56 determines whether the first high-beam lamp unit 24a is faulty. If the first high-beam lamp unit 24a is faulty, the diagnosis unit 56 notifies the vehicle control unit 16 to that effect. If the first high-beam lamp unit 24a is not faulty, the first high-beam lamp unit 24a turns on, as illustrated in FIG. 6B.

Figure 6C:
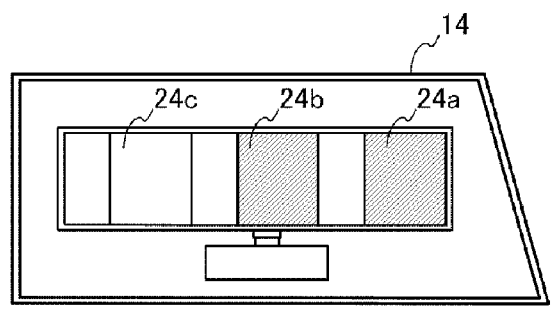

Subsequently, as illustrated in FIG. 5, the on/off control unit 54 controls the second high-beam lamp unit 24b to reach target luminance in the time t1, upon a time t2 (e.g., 300 msec) having elapsed. At this point, the diagnosis unit 56 determines whether the second high-beam lamp unit 24b is faulty. If the second high-beam lamp unit 24b is faulty, the diagnosis unit 56 notifies the vehicle control unit 16 to that effect. If the second high-beam lamp unit 24b is not faulty, the second high-beam lamp unit 24b, in addition to the first high-beam lamp unit 24a, turns on, as illustrated in FIG. 6C.

Figure 6D:
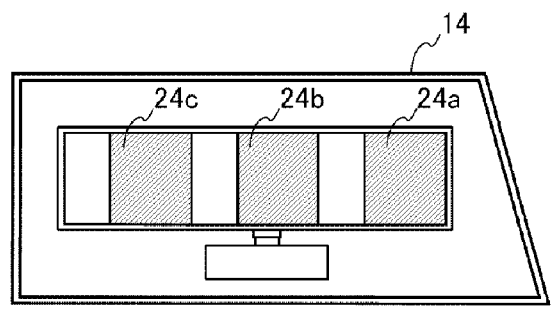

In a similar manner, as illustrated in FIG. 5, the on/off control unit 54 controls the third high-beam lamp unit 24c to reach target luminance in the time t1, upon the time t2 having elapsed. At this point, the diagnosis unit 56 determines whether the third high-beam lamp unit 24c is faulty. If the third high-beam lamp unit 24c is faulty, the diagnosis unit 56 notifies the vehicle control unit 16 to that effect. If the third high-beam lamp unit 24c is not faulty, the third high-beam lamp unit 24c, in addition to the first high-beam lamp unit 24a and the second high-beam lamp unit 24b, turns on, as illustrated in FIG. 6D.

Figure 6E:
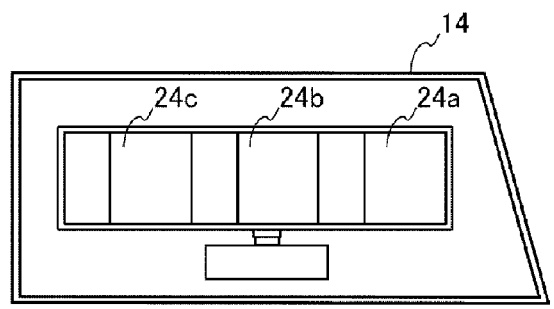

Subsequently, as illustrated in FIG. 5, the on/off control unit 54 gradually lowers the luminance of the first high-beam lamp unit 24a, the second high-beam lamp unit 24b, and the third high-beam lamp unit 24c to be turned off in a time t3 (e.g., 300 msec), upon the time t2 having elapsed. Then, as illustrated in FIG. 6E, the first high-beam lamp unit 24a, the second high-beam lamp unit 24b, and the third high-beam lamp unit 24c turn off. In addition, the on/off control unit 54 controls the leveling mechanism 30 to bring the optical axis of each lamp unit to aim in the direction of the normal operation.

With the vehicle lamp system 12 according to the embodiment described thus far, a fault diagnosis is carried out in a state in which the level of the optical axis is lowered. Therefore, glare that could be caused to a pedestrian or a driver of another vehicle by a fault diagnosis of the high-beam lamp unit 24 can be suppressed.

In addition, with the vehicle lamp system 12 according to the embodiment, when the high-beam lamp unit 24 is turned on for a fault diagnosis, the high-beam lamp unit 24 is turned on at a luminous intensity that is lower than a luminous intensity at which the high-beam lamp unit 24 is turned on for forming a high-beam light-distribution pattern. Therefore, glare that could be caused to a pedestrian or a driver of another vehicle by a fault diagnosis of the high-beam lamp unit 24 can be suppressed more reliably.

With the vehicle lamp system 12 according to the embodiment, a fault diagnosis of the high-beam lamp unit 24 is carried out while the optical axis of the lamp unit is being lowered by the leveling mechanism 30 to detect the initial position of the lamp unit. Accordingly, the total time it takes to detect the initial position and to carry out a fault diagnosis can be reduced, as compared to a case in which the detection of the initial position and the fault diagnosis are carried out separately. Therefore, a waiting time for the driver upon the engine being started is reduced, and thus any sense of discomfort given to the user can be reduced.

According to the embodiment, when the high-beam lamp unit 24 is turned on for a fault diagnosis with the vehicle lamp system 12, each of the high-beam lamp units is turned on at a different timing. In this case, whether there is any faulty high-beam lamp unit can even be visually determined with ease.

With the vehicle lamp system 12 according to the embodiment, each of the high-beam lamp units turns on for a fault diagnosis at a different timing, upon the engine being started. In one example, the high-beam lamp units turn on sequentially from the inner side to the outer side of the vehicle. Therefore, this configuration not only makes it possible to carry a fault diagnosis but also lets a pedestrian in front of the vehicle recognize the present of the vehicle with ease. Furthermore, this configuration makes the appearance of the vehicle lamp 14 and the vehicle when the engine is started unconventionally.

Thus far, the configuration and the operation of the vehicle lamp system according to the embodiment have been described. This embodiment, however, is merely illustrative, and it should be appreciated by a person skilled in the art that various modifications can be made to the combinations of the components of the embodiment and that such modifications also fall within the scope of the present invention.

(First Modification)

In the embodiment, a case in which a fault diagnosis is carried out upon the engine being started has been described, but this is not a limiting example. For example, fault diagnosis may be carried out upon the light switch 17 being turned on. In other words, a fault diagnosis may be carried out when electricity starts being supplied to the vehicle lamp 14. For example, the vehicle lamp system 12 may include a switch that receives an execution instruction of a fault diagnosis, and the fault diagnosis may be carried out upon that switch being turned on.

(Second Modification)

In the embodiment, a case in which the vehicle lamp 14 includes three high-beam lamp units has been described, but this is not a limiting example. It may suffice that the vehicle lamp 14 include a plurality of high-beam lamp units, and the vehicle lamp 14 may include two or four or more high-beam lamp units.

(Third Modification)

Although the embodiment does not point out in particular, the light source 40 of each high-beam lamp unit may be constituted by a plurality of separate light sources. In this case, the plurality of separate light sources may be disposed so as to be aligned adjacent to one another in the horizontal direction. Then, the separate light sources may be turned on substantially simultaneously or may be turned on with some time difference. In addition, the on/off control unit 54 may turn on all of the plurality of separate light sources or may turn on some of the separate light sources.

A vehicle lamp system according to an aspect of the present invention includes at least one lamp unit that can form a high-beam light-distribution pattern, a leveling unit that vertically adjusts an optical axis of the lamp unit, and a control unit that controls on/off of the lamp unit and controls the leveling unit. Irrespective of whether a turn-on instruction is present, the control unit controls the lamp unit to turn on for a predetermined period of time in a state in which the leveling unit adjusts the optical axis of the lamp unit to aim more vertically downward than in normal operation.

According to this aspect, the lamp unit is turned on for a predetermined period of time in a state in which the optical axis of the lamp unit extends in a downward direction, and thus a fault diagnosis of the lamp unit can be carried out while glare to be caused to a driver of a vehicle present in front or to a pedestrian is being suppressed.

When the lamp unit is turned on for a predetermined period of time in a state in which the leveling unit adjusts the optical axis of the lamp unit to aim more vertically downward than in normal operation, the control unit, to form a high-beam light-distribution pattern, may control the lamp unit to turn on at a luminous intensity that is lower than a luminous intensity at which the lamp unit is turned on. With this configuration, glare to be caused to a driver of a vehicle present in front or to a pedestrian can be further suppressed.

the control unit may adjust, upon electricity being first supplied to a light source provided in the lamp unit, the optical axis of the lamp unit to aim more vertically downward than in normal operation with the use of the leveling unit to detect an initial position of the lamp unit, and control unit controls the lamp unit to turn on for a predetermined period of time in that state. With this configuration, a fault diagnosis can be carried out when the initial position of the lamp unit is detected.

A diagnosis unit that carries out a fault diagnosis of the lamp unit by detecting a lighting state of the lamp unit and that, upon making a fault diagnosis, transmits a signal indicating that the lamp unit is faulty to the control unit may further be provided.

The vehicle lamp system may include a plurality of lamp units. The control unit may control the plurality of lamp units to turn on at a time difference.

The control unit may control the plurality of lamp units to turn on sequentially, from a lamp unit that is located more towards the center of a vehicle, to lamp units more outward. This configuration makes the appearance of the vehicle lamp and the vehicle unconventional.

What is claimed is:

1. A vehicle lamp system, comprising:
   at least one lamp unit that can form a high-beam light-distribution pattern by a light source;
   a leveling unit that vertically adjusts an optical axis of the lamp unit; and
   a control unit that controls on/off of the lamp unit and controls the leveling unit,
   wherein, the control unit is configured to adjust, upon electricity being first supplied to the light source provided in the lamp unit, the optical axis of the lamp unit to aim more vertically downward than in a normal operation by using the leveling unit to set an initial position of the lamp unit, wherein the initial position is a position in which the lamp unit approximately abuts against a stopper, and the control unit controls the lamp unit to turn on for a predetermined period of time in a state in which the control unit adjusts the optical axis of the lamp unit to aim more vertically downward than in a normal operation to set the initial position.

2. The vehicle lamp system according to claim 1, wherein, when the lamp unit is turned on for a predetermined period of time in a state in which the leveling unit adjusts the optical axis of the lamp unit to aim more vertically downward than in normal operation, the control unit, to form a high-beam light-distribution pattern, controls the lamp unit to turn on at a luminous intensity that is lower than a luminous intensity at which the lamp unit is turned on during the normal operation.

3. The vehicle lamp system according to claim 1, further comprising:
   a diagnosis unit that carries out a fault diagnosis of the lamp unit by detecting a lighting state of the lamp unit and that, upon making a fault diagnosis, transmits a signal indicating that the lamp unit is faulty to the control unit.

4. The vehicle lamp system according to claim 1, wherein the vehicle lamp system includes a plurality of the lamp units, and
   wherein the control unit controls the plurality of lamp units to turn on at different times.

5. The vehicle lamp system according to claim 4, wherein the control unit controls the plurality of lamp units to turn on sequentially, from a lamp unit that is located more towards the center of a vehicle, to lamp units more outward.

* * * * *